Nov. 30, 1943.   E. E. HOWE   2,335,593
ATTACHING NUT
Filed Sept. 2, 1941
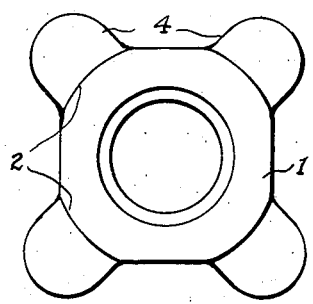
Fig. 1
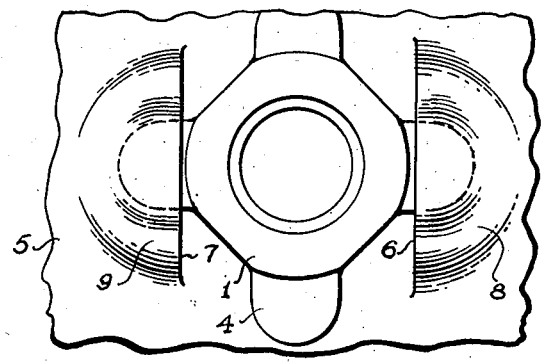
Fig. 3
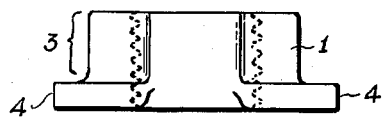
Fig. 2
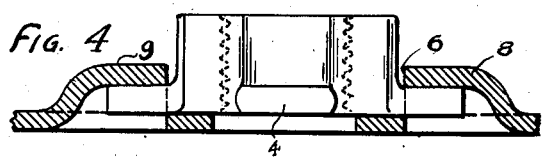
Fig. 4
Fig. 5
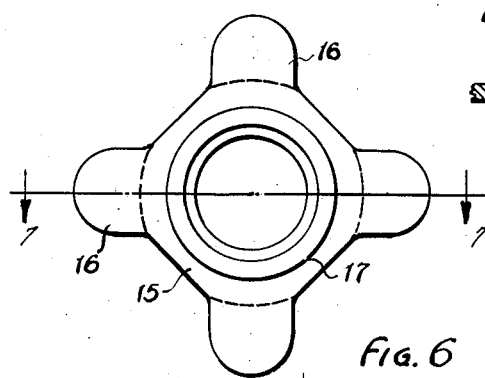
Fig. 6
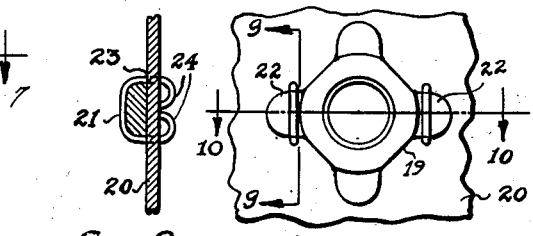
Fig. 9   Fig. 8
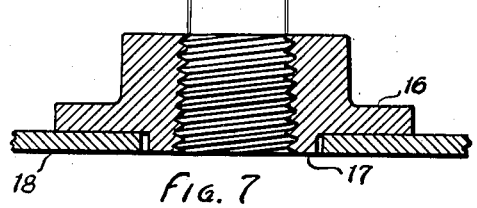
Fig. 7
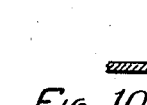
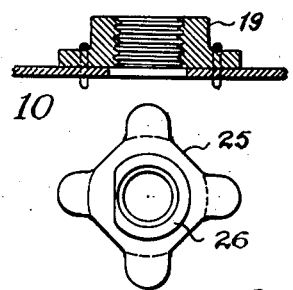
Fig. 10
Fig. 11
Fig. 12
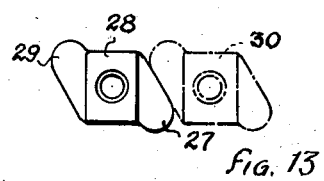
Fig. 13
INVENTOR.
Earl E. Howe
BY Patented Nov. 30, 1943

2,335,593

UNITED STATES PATENT OFFICE 2,335,593

ATTACHING NUT

Earl E. Howe, Royal Oak, Mich., assignor to
F. L. McLaughlin, Detroit, Mich.

Application September 2, 1941, Serial No. 409,185

2 Claims. (Cl. 85—32)

This invention relates to clinch nuts and has for its object to provide a nut of this type which can be made in one operation from a standard nut of rectangular plan view, and hence at maximum economy.

Another object is to provide a nut which lends itself to attachment to the work either by spot welding or by engagement with a formation in the work or by separate mechanical attachment as by clinching wires.

Another object is to provide a nut which lends itself to operations where the work is to be taken to the machine or where the nut is taken to the work.

A further object of the invention is to provide a clinch nut which can be started onto a bolt as readily as a conventional nut but which will serve as its own lock washer. This effect is obtained by causing the threads to converge slightly from their base to their outer end. If the nuts are tapped before the single forming operation hereinafter described this slight convergence will result and may be controlled within certain limits to obtain the desired lock washer effect.

Another object is to teach how to modify my improved nut to adapt it to certain jobs now performed by other more expensive nuts. As an example, this nut may be formed with a lower collar of D-shape or of circular shape.

Other objects and advantages will become more fully apparent as reference is had to the accompanying drawing wherein my invention is illustrated, and in which Fig. 1 is a top plan view of my improved nut ready to be spot welded to work, Fig. 2 is a side elevation of the nut of Fig. 1, Fig. 3 is a top plan view of the nut engaging formations in the work, Fig. 4 is a side elevation of the nut and work of Fig. 3 in which the nut protrusions tightly contact the work, Fig. 5 is a view similar to Fig. 4 in which the nut has floating engagement with the work, Fig. 6 is a bottom plan view of a modification of the nut shown in Figs. 1-5, inclusive, and in which a circular collar is formed on the bottom side, Fig. 7 is a vertical section taken along the line 7—7 of Fig. 6, Fig. 8 shows a nut similar to those of Figs. 1-5 which is attached to the work by a clinch wire, Fig. 9 is a cross-sectional view taken along the line 9—9 of Fig. 8, Fig. 10 is a cross section taken along the line 10—10 of Fig. 8, Fig. 11 is a further modification of the nut in bottom plan, which is generally similar to that of Figs. 3, 4 and 5 and in which the collar is D-shaped, Fig. 12 is a side elevation of the nut of Fig. 11, and Fig. 13 is a top plan view of a modification of the nut of Fig. 1.

More particularly, 1 indicates a clinch nut body having a protrusion extending from each corner thereof. The blank from which this clinch nut was formed was an ordinary nut, rectangular, square or round in plan view which has been subjected to a die or cutter tool which sheared each corner along the lines 2 for a substantial depth 3. The sheared metal is flattened top and bottom into lateral extensions or ears 4 which are suitable for attachment to the work by spot-welding. The thickness of the ears 4 should be approximately the same as the sheet to which they are to be welded.

Clinch nuts are used for a variety of purposes, some of which require rigid attachment to the work and the attachment may be made permanent as by welding. Where the clinch nut must be demountably attached to the work, as where it is not convenient or otherwise desirable to weld, the work may be formed to receive the nut in the manner shown in Figs. 3, 4 and 5.

In this figure, the work 5 is sheared along the lines 6 and 7 and the material adjacent thereto is depressed in a generally semi-circular shape. The depressions indicated generally by the numerals 8 and 9 are of sufficient depth so that one ear 4 may be inserted beneath one edge 6 and then another ear 4 inserted beneath the other edge 7 as the nut is rotated into the position illustrated. The depressions may then be hit with a hammer or other tool and flattened to the extent that the ears 4 may not be disengaged therefrom.

In some instances the clinch nut is to be firmly engaged with the depressions in which case the proportions of the ears and of the depressions will be such as to firmly contact each other while in other cases the nut must float. The former condition is illustrated in Fig. 4 where a comparatively shallow depression is provided while Fig. 5 illustrates the latter condition in which clearances 10 are provided.

Figs. 6 and 7 illustrate a modification in which the nut 15 is composed of a nut body similar in plan view to the nut body 1 and having ears 16 which are formed above the bottom of the nut body in order to leave a bottom collar portion 17 which has an outside contour of circular shape. The collar portion 17 has a depth equal to that of the work 18 into which it is inserted. The ears 16 may be welded to the work.

Figs. 8, 9 and 10 illustrate a nut 19 as shown in Figs. 1 to 5 which is attached to the work 20 by clinch wires or staples 21. These staples are looped over at least two ears 22, inserted through holes 23 in the work and struck on top while holding a backing up tool against the ends. This causes the ends to curl over as indicated at 24 thus holding the clinch nut in place. For thin metal the holes 23 are not originally provided but are formed by the staples in what may be termed the stitching operation.

Figs. 11 and 12 illustrate a nut 25 similar in all respects to the nut shown in Figs. 6, 7 and 8 except that the collar portion 26 is D-shaped in bottom plan view instead of circulars as previously described.

A further modification is illustrated in Fig. 13 in which a wire is first flattened then rollers or shear dies strike the wire at intervals to form flattened portions 27 between the body portions 28. The shear is then made along diagonal lines 29. The numeral 30 indicates a completed nut which has just been sheared from the flattened portion 27.

It has been found that if the nut blank is tapped before the corners of the blank are sheared the threads may be made to converge a slight amount as indicated by the angle $a$ in Fig. 7 and that this will be true in all forms illustrated. The mating bolt may be started in the threads as easily as in a conventional nut, but a tool will be necessary thereafter. This nut, therefore, does not need a lock washer. The amount of convergence may be controlled within limits depending on the degree that this locking effect is wanted. The threads may also be tapped after the nut is otherwise complete, in which case there will be no convergence angle $a$.

What is claimed is:

1. A nut of generally rectangular plan view having flattened corners each terminating at its bottom in an ear of substantially less depth than the height of the nut, said ears projecting out of the contour of the body of the nut and forming a nut having the general shape of a four leaf clover when seen in top or bottom plan view.

2. A nut of generally rectangular plan view having flattened corners each terminating at its bottom in an ear of substantially less depth than the height of the nut and extending radially and laterally of said corners, and a collar of smaller diameter than the nut body below said ears, said ears being composed of the stock displaced by the flattening of said corners during manufacture and each ear being substantially spaced from adjacent ears.

EARL E. HOWE.